United States Patent [19]

Hatridge

[11] 4,002,257
[45] Jan. 11, 1977

[54] THERMAL COVER

[76] Inventor: Charles L. Hatridge, Rte. 3, Salem, Mo. 65560

[22] Filed: Dec. 18, 1975

[21] Appl. No.: 641,904

[52] U.S. Cl. .............................. 215/13 A; 150/52 R
[51] Int. Cl.² ...................................... A47J 41/00
[58] Field of Search ....................... 215/13 A, 13 R; 150/52 R

[56] References Cited

UNITED STATES PATENTS

| 1,382,070 | 6/1921 | Fate | 215/13 R |
| 2,017,560 | 10/1935 | Woodley | 215/13 R |
| 2,685,319 | 8/1954 | Swasko | 150/52 R |
| 2,759,337 | 8/1956 | Katz | 215/13 R |
| 3,070,253 | 12/1962 | Brown | 215/13 R |
| 3,120,319 | 2/1964 | Buddrus | 215/13 R |
| 3,155,260 | 11/1964 | Widener | 215/13 R |
| 3,779,298 | 12/1973 | Piccirilli | 150/52 R |

FOREIGN PATENTS OR APPLICATIONS 990,011  4/1965  United Kingdom ............ 215/13 R Primary Examiner—Ro E. Hart
Attorney, Agent, or Firm—Bacon & Thomas

[57] ABSTRACT

A thermally insulating cover for a jug is provided by upper and lower cover portions substantially surrounding the jug and removable from one another to readily permit jug replacement. The upper and lower cover portions are biased together and the upper portion has an aperture therethrough for connection of a pouring spout to the jug.

9 Claims, 2 Drawing Figures

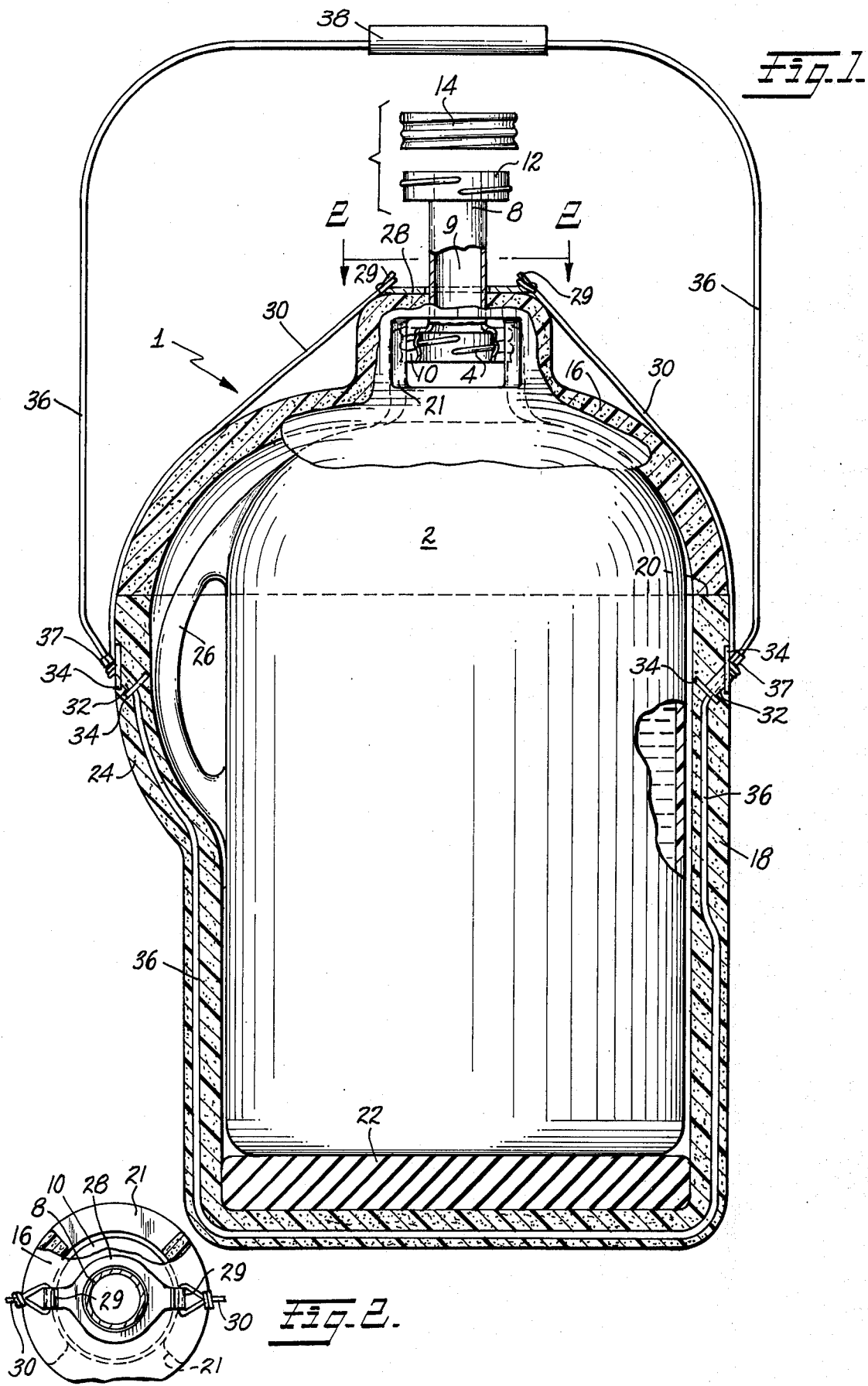

THERMAL COVER

BACKGROUND OF THE INVENTION

1. Field of the Invention

The invention pertains to insulated covers for liquid containers or jugs.

2. Description of the Prior Art

Numerous prior art thermal insulators are provided which utilized conventional vacuum spacings to thermally insulate an interior container from ambient temperatures. Other prior art devices show the use of lightweight styrofoam as the insulating means without the use of vacuum spacings. Patents representative of these prior art teachings are illustrated by U.S. Pat. Nos. 2,788,149, 3,265,250, 3,132,759 and 3,120,319.

Most prior art insulated containers are not adapted for use with conventional water jugs such as one-half gallon or gallon plastic or glass jugs utilized for carrying a wide variety of liquid refreshments. Thus, most thermal containers require the use of a special inner container, and liquid must be poured therein through an opening in the insulative cover. Although some insulative covers are provided for conventional bottles or jars such as that shown in the above-mentioned U.S. Pat. No. 2,788,149, these prior art devices do not provide substantial insulative coverings for the interior container during pouring of liquid refreshments therefrom nor are they readily adaptable for use with half gallon or gallon jugs having conventional threaded nip sections.

SUMMARY OF THE INVENTION

It is therefore an object of the invention to overcome the disadvantages of the prior art and to provide a thermally insulative cover for a conventional plastic or glass jug.

Another object of the invention is to provide a thermally insulated cover for a jug which cover may readily permit the interchange of one jug for another.

Another object of the invention is to provide a thermally insulating cover having a pouring spout passing through the top portion of the cover for connection to the interior jug and for providing fluid communication thereto.

Another object of the invention is to provide a lightweight easily fabricated thermal cover for a plastic or glass jug.

Yet another object of the invention is to provide a thermally insulated jug having a bottom sponge layer which may yield upon contraction or expansion of a plastic jug and yet absorb moisture from condensation on the exterior of the jug.

The instant invention thus provides a thermally insulated cover for a jug which has a conventional threaded aperture section or nip for pouring liquid therethrough. The thermally insulating cover comprises an upper cover portion and a lower cover portion. A pouring spout is positioned through an aperture in the upper cover portion and means are provided for threadably securing the pouring spout to the threaded aperture section of the jug. Means are also provided for releasably biasing the upper and lower portions of the jug together so that the jug is substantially surrounded by the upper and lower cover portions.

In use, conventional glass or plastic jugs filled with a cold refreshment may be sold at numerous stores or service stations and these jugs may be easily inserted into the thermally insulative cover described herein. Due to the wide availability of these conventional jugs, the instant cover may be readily employed without the necessity of designing special inner liquid containers adapted only for special purposes.

BRIEF DESCRIPTION OF THE DRAWINGS

Other objects of the invention will become clear in connection with the following description taken in conjunction with the drawings wherein:

FIG. 1 is a side view of the invention mostly in section wherein the interior jug is shown partially sectioned; and FIG. 2 represents a top view of the insulating cover taken along line 2—2 of FIG. 1.

DETAILED DESCRIPTION OF THE PREFERRED EMBODIMENT

As shown in FIG. 1, the insulating cover 1 houses a plastic or glass jug 2 which has a conventional nip or threaded section 4. The insulating cover is adapted with a pouring spout 8 having a channel 9 therethrough and an integral threaded member 10 which forms a means for threadably securing the pouring spout 8 to the jug 2. Pouring spout 8 also has an upper threaded section 12 which is adapted for use with a mating threaded cap 14. Advantageously, the threaded sections 4 and 12 may be identical such that the conventional cap 14 utilized with jug 2 may also be employed to seal the pouring spout 8 of the insulating cover 1.

Insulating cover 1 is made of a light-weight thermally insulative material such as styrofoam and has an upper or a top cover portion 16 and a lower or a bottom cover portion 18. The top and bottom portions are removable from one another and are shown touching along their edges as indicated at line 20. An aperture or slot 21 is provided in top cover portion 16 to provide access to the threaded member 10 on each side of pouring spout 8. As shown in FIG. 2, the slot 21 allows the threaded member 10 to be turned when the top cover portion 16 is positioned over the jug 2. A sponge 22 is provided within the interior of the bottom cover portion 18. The sponge is utilized to absorb moisture and, in the case of a plastic jug, is yieldable (compressible or expandable) to match small changes in jug volumn due to melting ice. Jug 1 is provided with an enlarged section 24 to compensate for a handle 26 of the jug 1 as shown.

The insulating cover 1 is further provided with a means for releasably biasing the top and bottom cover portions together. The biasing means may comprise, for example, a retainer 28 adapted on the pouring spout 8 and having curved end portions or projections 29 for securing an elastic member 30 thereto. Elastic member 30 is shown secured at its other end to cord 36. A retainer 37 prevents slippage of elastic member 30 up along cord 36. Two such elastic members 30 are shown. Alternatively, the elastic members 30 may be connected to the lower cover portion 18 as, for example, by connection to tubular members 32. Cord 36 is embedded in the interior of bottom cover portion 18 and passes through tubular members 32 and exterior of the cover 1 to form a carrying means. Tubular members 32 have flanges 34 for securing the tubular members within the bottom cover portion 18. A handle 38 may be provided on the cord 36 to facilitate carrying of the jug. Retainer 28 is also shown in FIG. 2 wherein the connection of the elastic members 30 to the projections 29 is better illustrated.

The top cover portion 16 may be easily removed to permit interchange of the jug 2. To remove the top cover portion 16 elastic members 30 are stretched so that they may be slipped over the projections 29 of the retainer 28. Releasing the elastic members 30 effectively releases the bias of the top cover portion 16 against the bottom cover portion 18. The threaded section 10 of pouring spout 8 is now turned to release or unthread the pouring spout 8 from the jug 2. Access to the threaded section 10 is obtained through the slots 21 in the top cover portion 16. Once the pouring spout 8 is released from jug 2, the entire top cover portion 16 may be removed, and jug 2 may be easily lifted out of the bottom cover portion 18. Sponge 22 may be squeezed out to remove excess water and replaced followed by the replacement of a new jug 2. To replace the cover, the top cover portion 16 is positioned over the bottom cover portion 18 and the threaded member 10 of pouring spout 8 is tightened onto the threaded section 4 of the replacement jug 2. Thus, the pouring spout 8 is now firmly secured to the jug 2 and the elastic members 30 are now reinserted over the projections 29 of retainer 28 thereby biasing the top cover portion 16 against the bottom cover portion 18.

Although the invention has been described with reference to a preferred embodiment, it will be understood that further modifications may be made by those of skill in the art and it is intended that this invention cover any such modifications or variations as fall within the scope of the appended claims.

I claim:

1. A thermally insulating cover for a jug, said jug having a threaded apertured section for pouring liquid therethrough, said cover comprising:
   a. a thermally insulating upper cover portion for covering an upper part of said jug,
   b. a pouring spout positioned through an aperture in said upper cover portion,
   c. means for threadably securing the pouring spout to the threaded apertured section of said jug,
   d. a thermally insulating lower cover portion for covering a lower part of said jug, and
   e. means for releasably biasing said upper and lower portions together whereby said jug is substantially surrounded by said upper and lower cover portions.

2. A thermally insulating cover as recited in claim 1 wherein said threadably securing means comprises a lower threaded member integral with said pouring spout.

3. A thermally insulating cover as recited in claim 2 wherein said pouring spout has an upper threaded section for receiving a cap.

4. A thermally insulating cover as recited in claim 3 wherein the diameter of the upper threaded section is approximately equal to the diameter of the threaded apertured section of said jug.

5. A thermally insulating cover as recited in claim 1 wherein the biasing means comprises elastic means.

6. A thermally insulating cover as recited in claim 5 wherein said elastic means comprises an elongated elastic band connected at one end to said lower cover portion and adapted to releasably bias said upper cover portion against said lower cover portion.

7. A thermally insulating cover as recited in claim 6 further comprising a retainer mounted on said pouring spout and slidable along said pouring spout, the other end of said elastic band releasably attached to said retainer.

8. A thermally insulating cover as recited in claim 1 wherein said lower cover portion has a bottom and a sponge is positioned at the bottom of said lower cover portion.

9. A thermally insulating cover as recited in claim 1 further comprising carrying means embedded within and surrounding said lower cover portion for carrying said cover.

* * * * *